United States Patent [19]

Kerley et al.

[11] Patent Number: 5,287,747
[45] Date of Patent: Feb. 22, 1994

[54] BOLT AND NUT EVALUATOR

[75] Inventors: James J. Kerley, Greenbelt; Raymond Burkhardt, Severn; Steven White, Upper Marlboro, all of Md.

[73] Assignee: The United States of America as represented by the Administrator of the National Aeronautics and Space Administration, Washington, D.C.

[21] Appl. No.: 885,697

[22] Filed: May 19, 1992

[51] Int. Cl.⁵ ............................................. G01D 7/02
[52] U.S. Cl. ........................................ 73/761; 73/789
[58] Field of Search ............ 73/761, 789, 791, 862.21

[56] References Cited

U.S. PATENT DOCUMENTS

| | | | |
|---|---|---|---|
| 4,104,778 | 8/1978 | Vliet | 73/761 X |
| 4,198,737 | 4/1980 | Eshghy | 29/240 |
| 4,944,188 | 7/1990 | Dial | 73/761 |
| 5,165,831 | 11/1992 | Yager et al. | 73/761 X |

Primary Examiner—Jerry W. Myracle
Attorney, Agent, or Firm—Paul S. Clohan, Jr.; R. Dennis Marchant; Guy M. Miller

[57] ABSTRACT

A device for testing fasteners such as nuts and bolts is described which consists of a fixed base plate having a number of threaded and unthreaded holes of varying size for receiving the fasteners to be tested, a torque marking paper taped on top the fixed base plate for marking torque-angle indicia, a torque wrench for applying torque to the fasteners being tested, and an indicator for showing the torque applied to the fastener. These elements provide a low-cost, non-destructive device for verifying the strength of bolts and nuts.

5 Claims, 18 Drawing Sheets

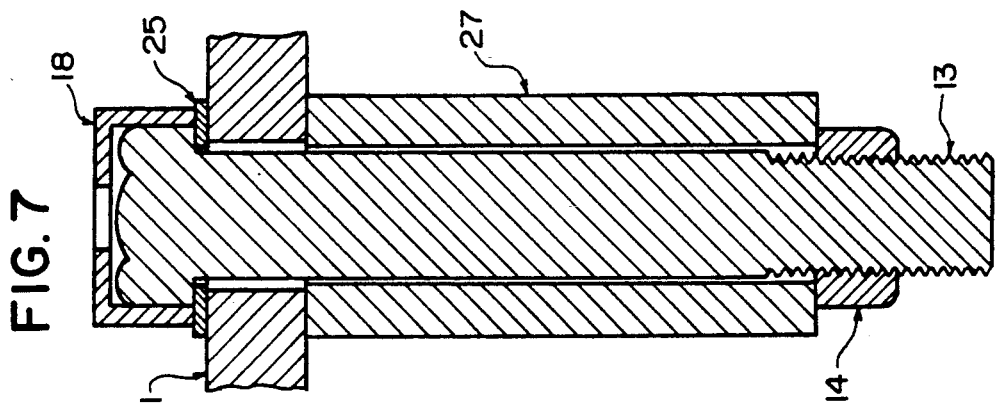
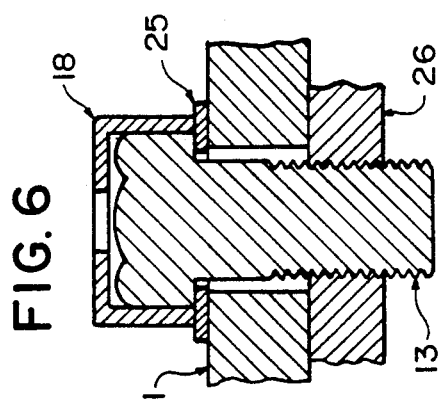
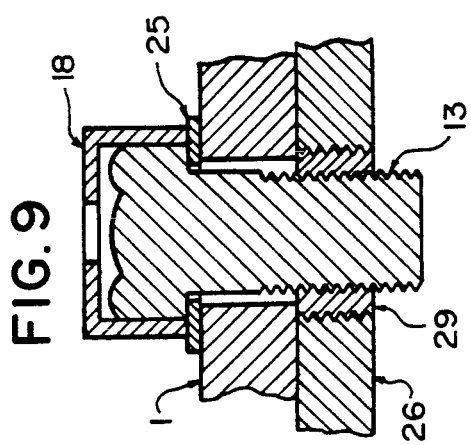
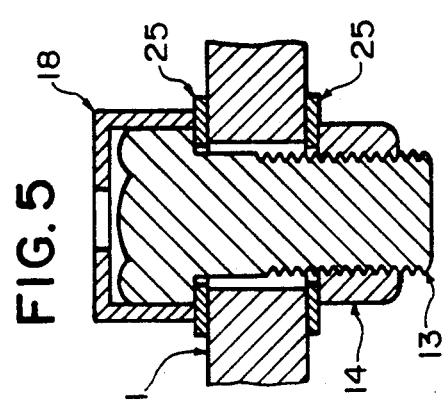
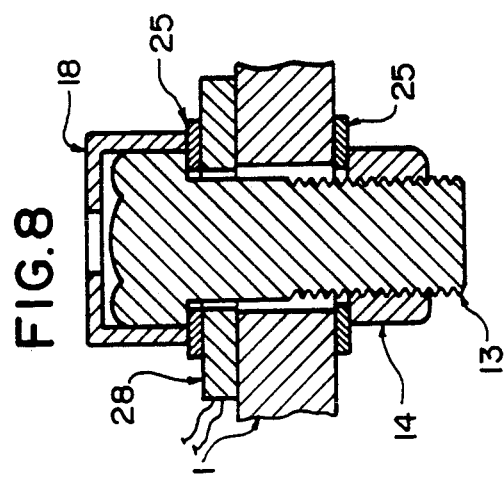

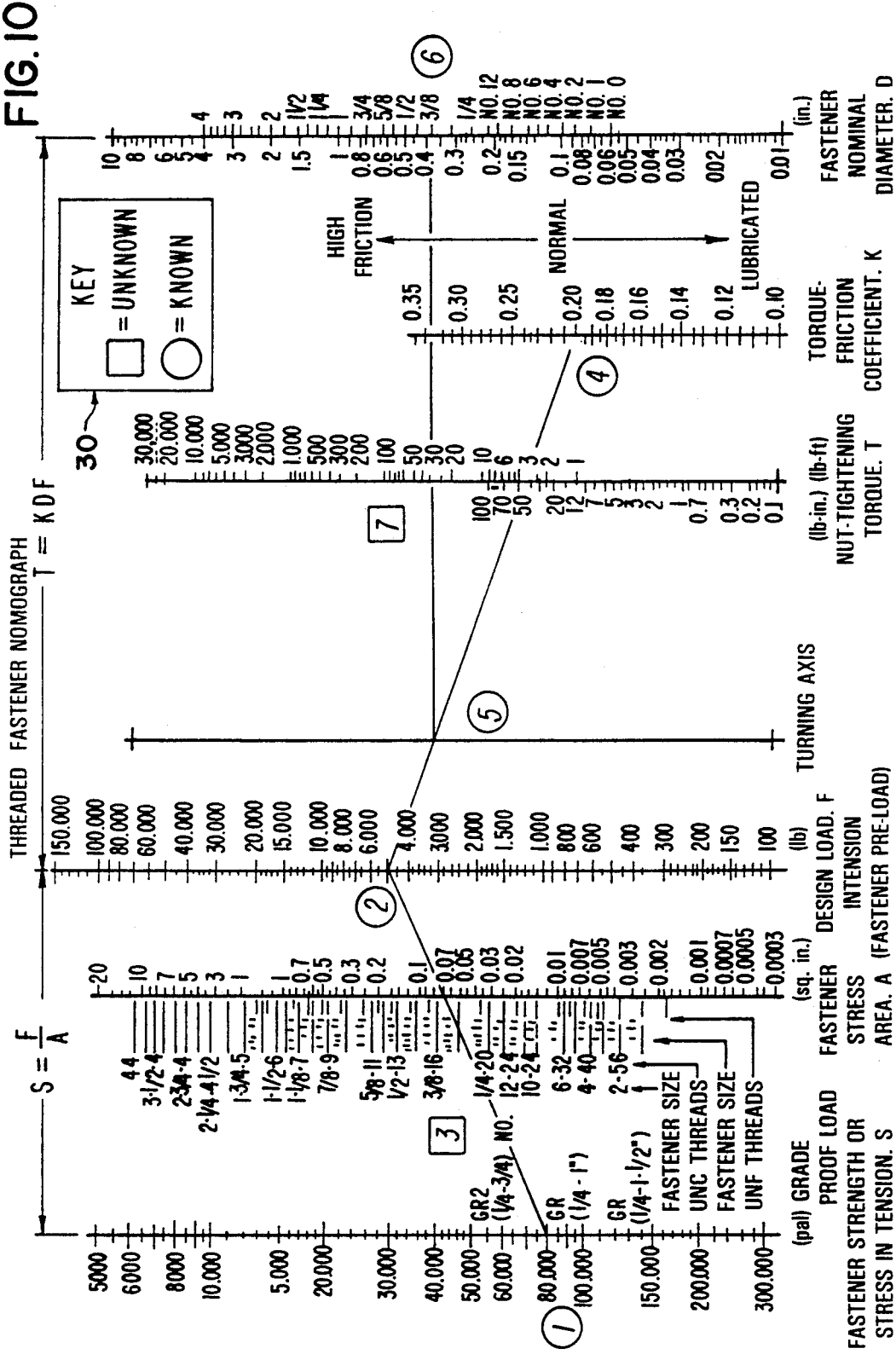

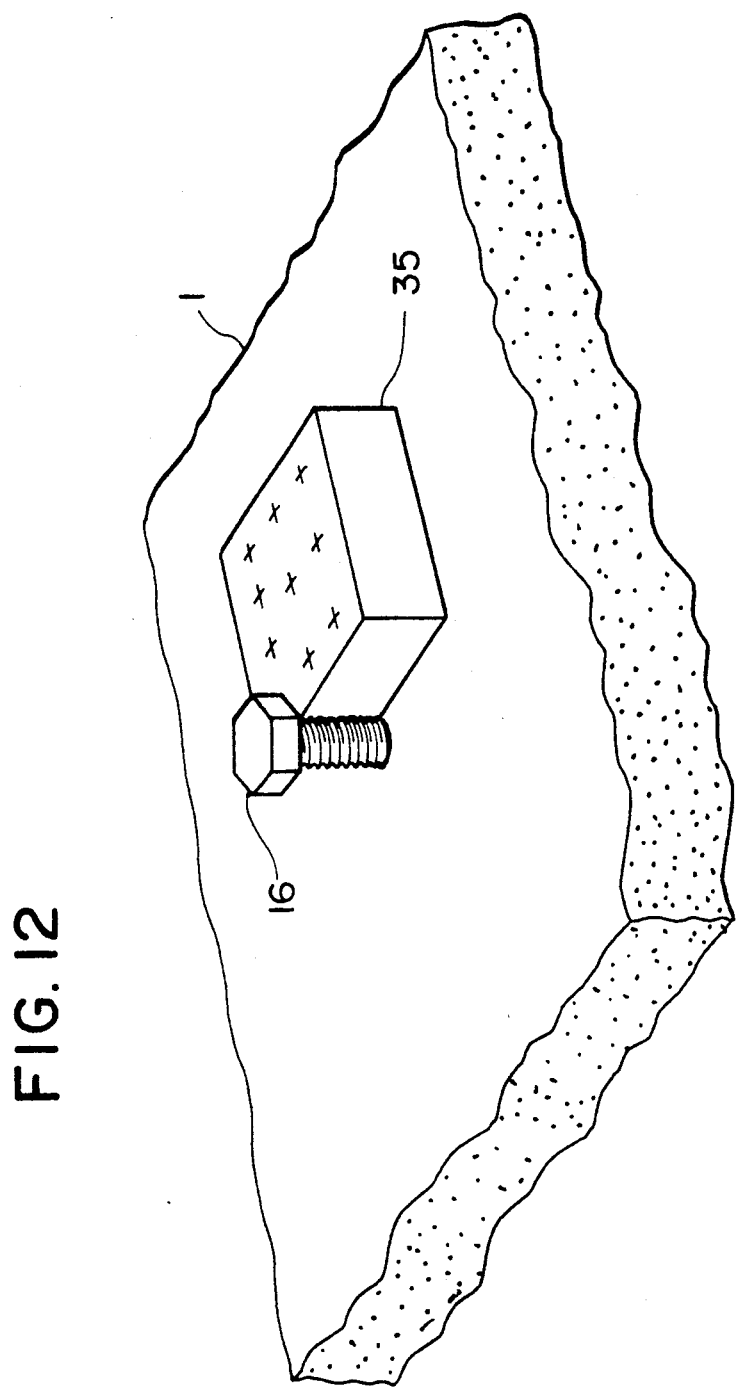

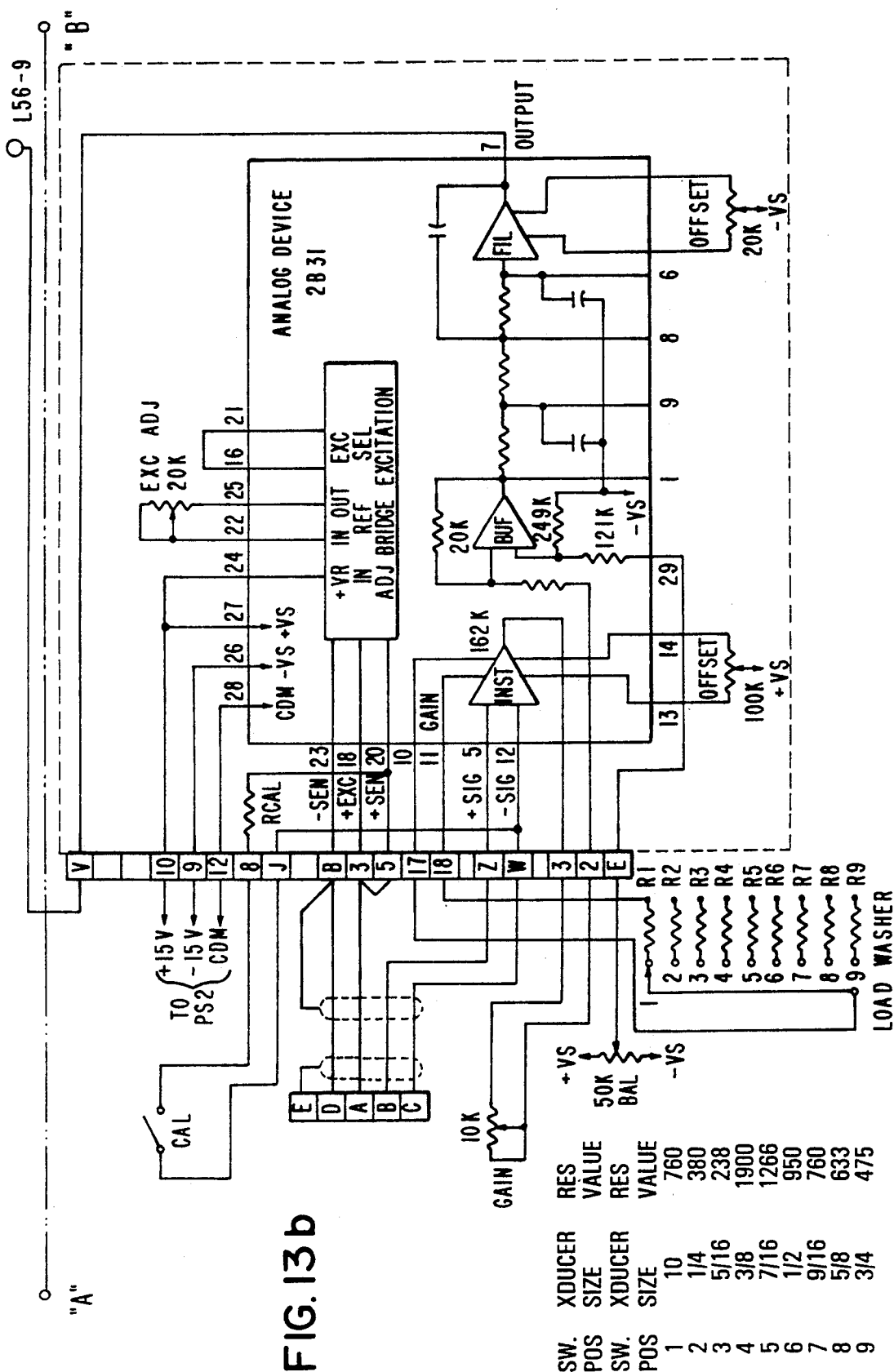

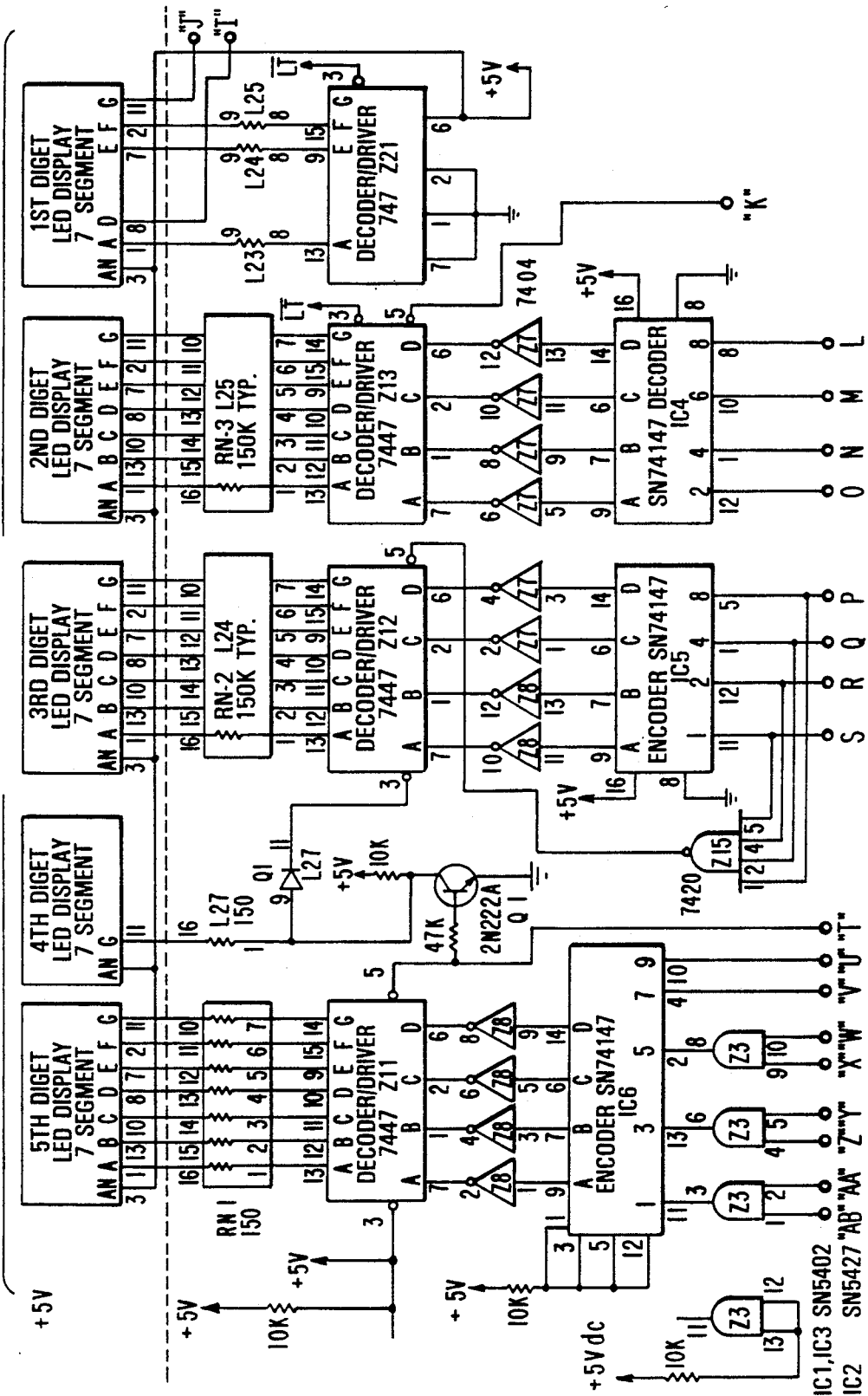

NOTES:

I.C.'S Z17 TO Z20
ARE 8 PIN DIP.
PIN NOS. ARE SOCKET
REF. ONLY

TYPICAL FOR K1 THRU K14

BOLT AND NUT EVALUATOR

ORIGIN OF THE INVENTION

The invention described herein was made in the performance of work under a NASA contract and by an employee of the United States Government and is subject to the provisions of Section 305 of the National Aeronautics and Space Act of 1958, Public Law 85-568 (72 Stat. 435; 42 U.S.C. §2457), and may be manufactured and used by or for the Government for governmental purposes without the payment of any royalties thereon or therefor.

TECHNICAL FIELD

This invention relates to measuring and testing and in particular to a device to measure the torque, stress, clamping force, coefficient of friction and yield points of bolts and nuts.

BACKGROUND ART

There are numerous methods and devices available for testing of bolts, nuts, inserts, and other fasteners. Most of these prior art devices are relatively expensive. There exists a need for a device to permit accurate and timely testing of a large size of such fasteners to assure that they are safe to use. It is desirable, therefore, to provide a low-cost fastener testing device which is versatile enough to test a variety of diameter of fasteners. It is also desirable that such testing devices have the capability of being mobile so as to permit field testing of fasteners.

STATEMENT OF THE INVENTION

It is therefore an object of the present invention to provide a low-cost, non-destructive device for verifying the strength of bolts and nuts.

Another object of the present invention is to provide a low-cost device to determine the coefficient of friction of nuts, bolts and washers.

A further object of the present invention is to provide a low-cost method for verifying the strength, coefficient of friction and torque for inserts.

A still further object of the present invention is to provide a low-cost method of determining safe operating torques for fasteners.

Another object of the invention is for calibrating standard bolts and nuts with load washers.

A further object of the invention is for determining strength, coefficient of friction and safe operating torques for bolts used in a tapped hole, for verifying bolt lubricants, for determining the coefficient of friction for different lubricants, plating, metals and the combinations thereof, as well as verifying strength, coefficient of friction and safe operating torques for many type of metals and plastics, steels, aluminum, titanium and fiber plastics.

A still further object is to provide a training tool for engineers and technicians so that they may learn proper techniques for tightening of bolts.

A final object of the invention is to provide a tool that can be used in the field to verify bolt strength, coefficient of friction and torque, and to provide a non-destructive test before bolt or nut use.

These and other objects are achieved by providing a device for testing fasteners such as nuts and bolts which consists of a fixed base plate having a number of threaded and unthreaded holes of varying size for receiving the fasteners to be tested, a torque marking paper taped on top the fixed base plate for marking torque-angle indicia, a torque wrench for applying torque to the fasteners being tested, and an indicator for showing the torque applied to the fastener. These elements provide a low-cost, non-destructive device for verifying the strength of bolts and nuts.

BRIEF DESCRIPTION OF THE DRAWINGS

FIG. 5 is a cross-section view of a short bolt with a nut under test.

FIG. 6 is a cross-section view of a short bolt with a taped plate under test.

FIG. 7 is a cross-section view of a long bolt with a nut under test.

FIG. 8 is a cross-section view of a short bolt with a nut and a load washer under test.

FIG. 9 is a cross-section view of an insert under test.

FIG. 10 is an illustration of a nomograph that may be used with the invention.

FIG. 12 further illustrates measurement of ductility of bolts and nuts.

FIGS. 13a–13j, patched together, show a block diagram of electronics that may be used with this invention.

DETAILED DESCRIPTION OF THE INVENTION

Figure 1:
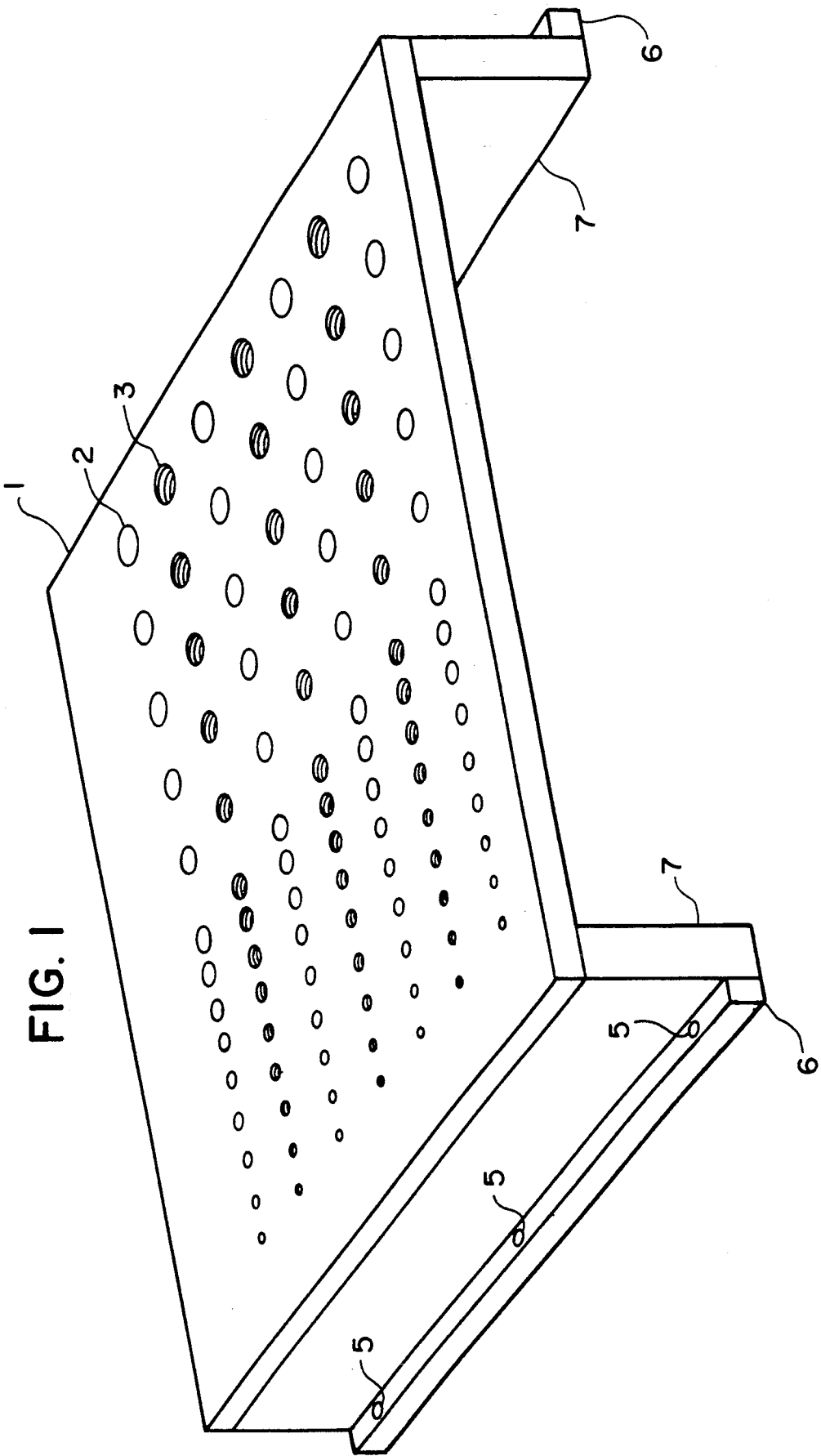
FIG. 1 is a perspective view of a base mounting plate which is used in the present inventive device.

Referring now to FIG. 1, a Base Mounting Plate 1 is shown and consists of a plate to take bolts and nuts and is held up by two vertical side plates 7 and clamped or bolted to a surface through bolt holes 5 or clamp edge 6. The plate has "thru-holes" 2 and tapped holes 3. The size of the bolts that can be tested are $\frac{1}{4}$, 5,16, $\frac{3}{8}$, 7/16, $\frac{1}{2}$, 9/16, $\frac{5}{8}$, $\frac{3}{4}$, $\frac{7}{8}$1, 1$\frac{1}{8}$, 1$\frac{1}{4}$, 1$\frac{3}{8}$ and 1$\frac{1}{2}$. Base mounting plate 1 can be made of steel or aluminum. If aluminum is used, then inserts should be used in tapped holes 3. Thruholes 2 do not need reinforcement. Base plate 1 should be at least $\frac{1}{2}$ inch thick. For small short bolts it may be necessary to counterbore under plate 1 so that the bolt can match the nut.

Figure 2:
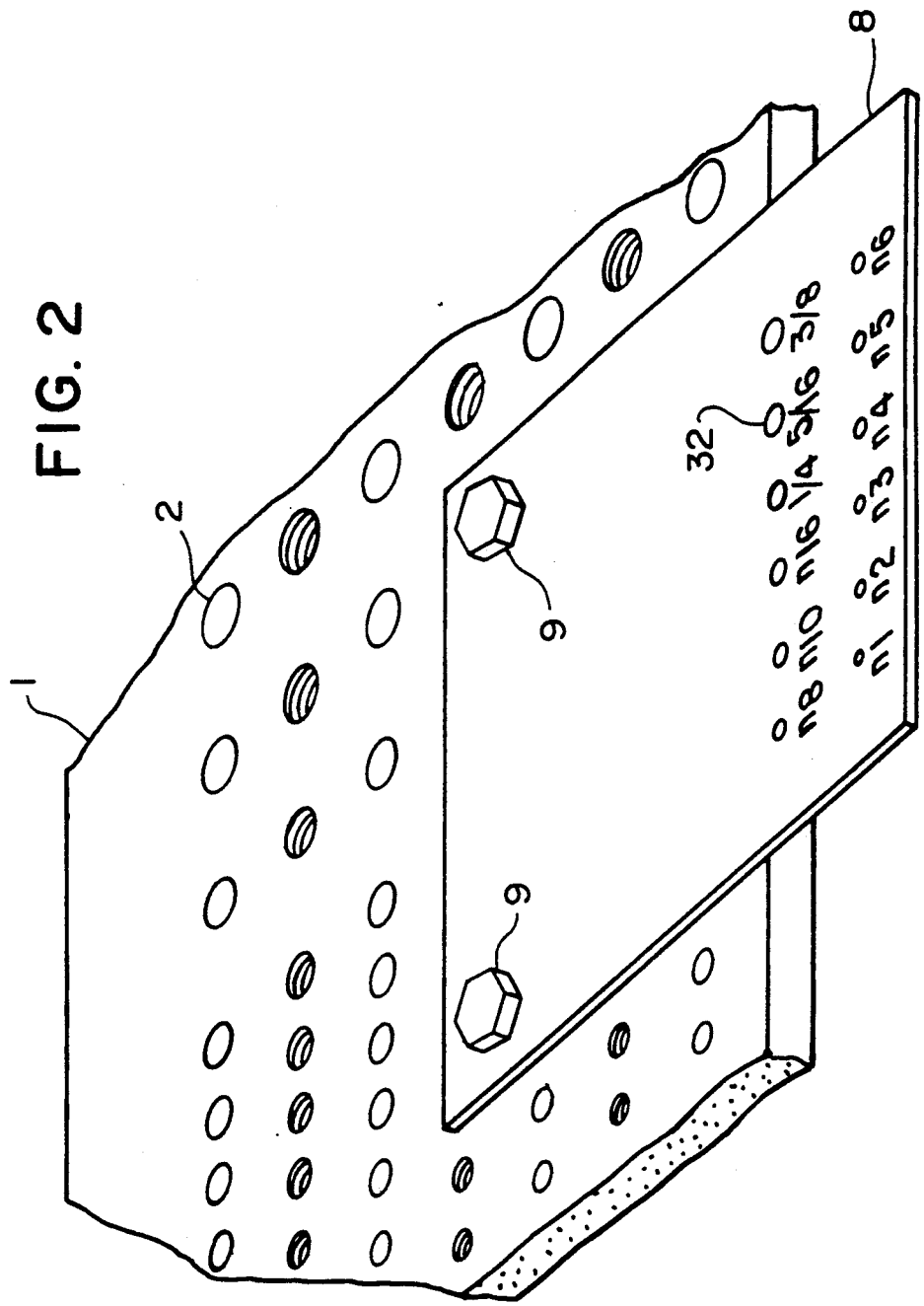
FIG. 2 is a perspective view of a modification to the base mounting plate of FIG. 1.

Many small bolts are too short for plate 1 of FIG. 1. Thus a thin plate 8 (approx. 1/16 inch thick) can be attached to base plate 1 by bolts 9 as shown in FIG. 2. There are thru-holes 32 for these small bolts.

Figure 3:
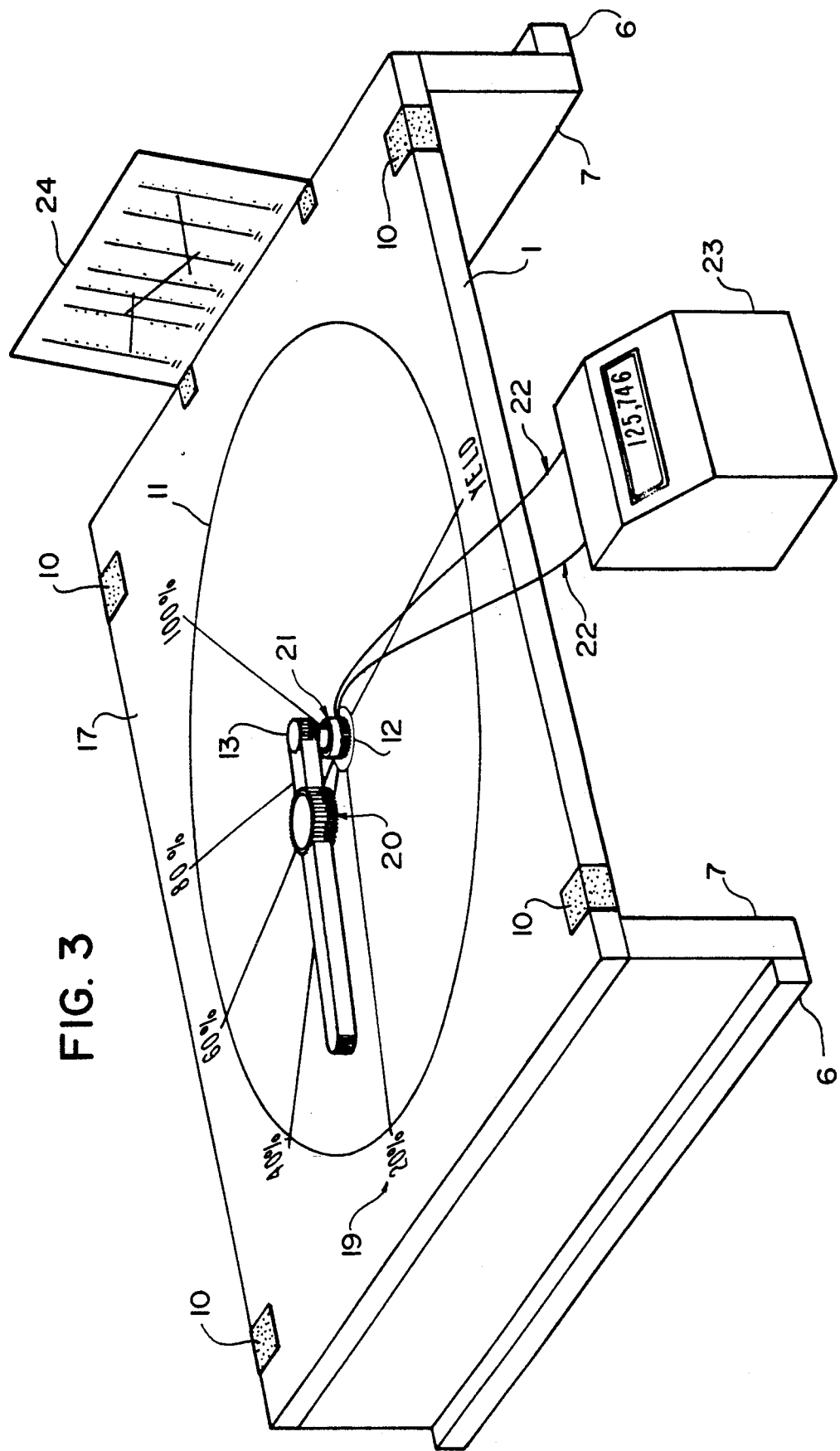
FIG. 3 is a perspective view of the preferred embodiment of the present invention.

Refer now to FIG. 3. A sheet of paper 17, the size of mounting plate 1, is mounted on top of plate 1 with tape 10 in the four corners as shown. A circle 11 is printed on paper 17 as indicated in the figure, the size of which will depend on the size of mounting plate 1. A 2 inch diameter hole 12 is cut through paper 17 to accommodate torque wrench 18. Torque wrench 18, with a dial indicator 20, is used to torque up bolt 13, which extends through plate 1. Torques can be calculated ahead of time to determine the torque required to yield bolt 13.

Then the 20%, 40%, 60%, 80% and 100% (shown as item 19) torques are applied to bolt 13 and marked on the top of paper 17.

Figure 4:
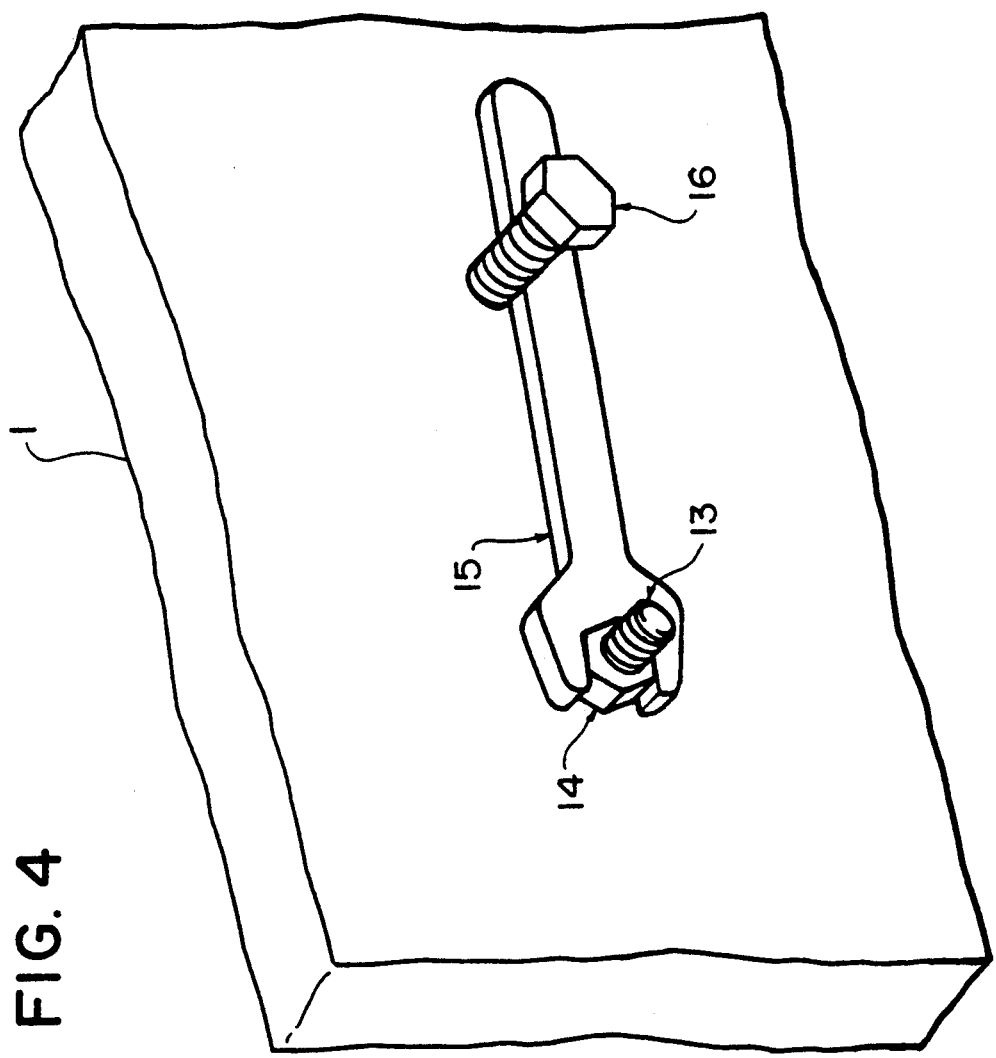
FIG. 4 is a view of the underside of the base mounting plate of FIG. 3.

Refer now to FIG. 4. This FIG. shows the under side of Plate 1. Bolt 13 is held by nut 14 and prevented from moving by wrench 15 as it presses against another bolt 16 used to keep nut 14 from rotating while bolt 13 rotates on top of plate 1. In this way the amount of twist is always marked on paper 17 above plate 1.

Figure 14:
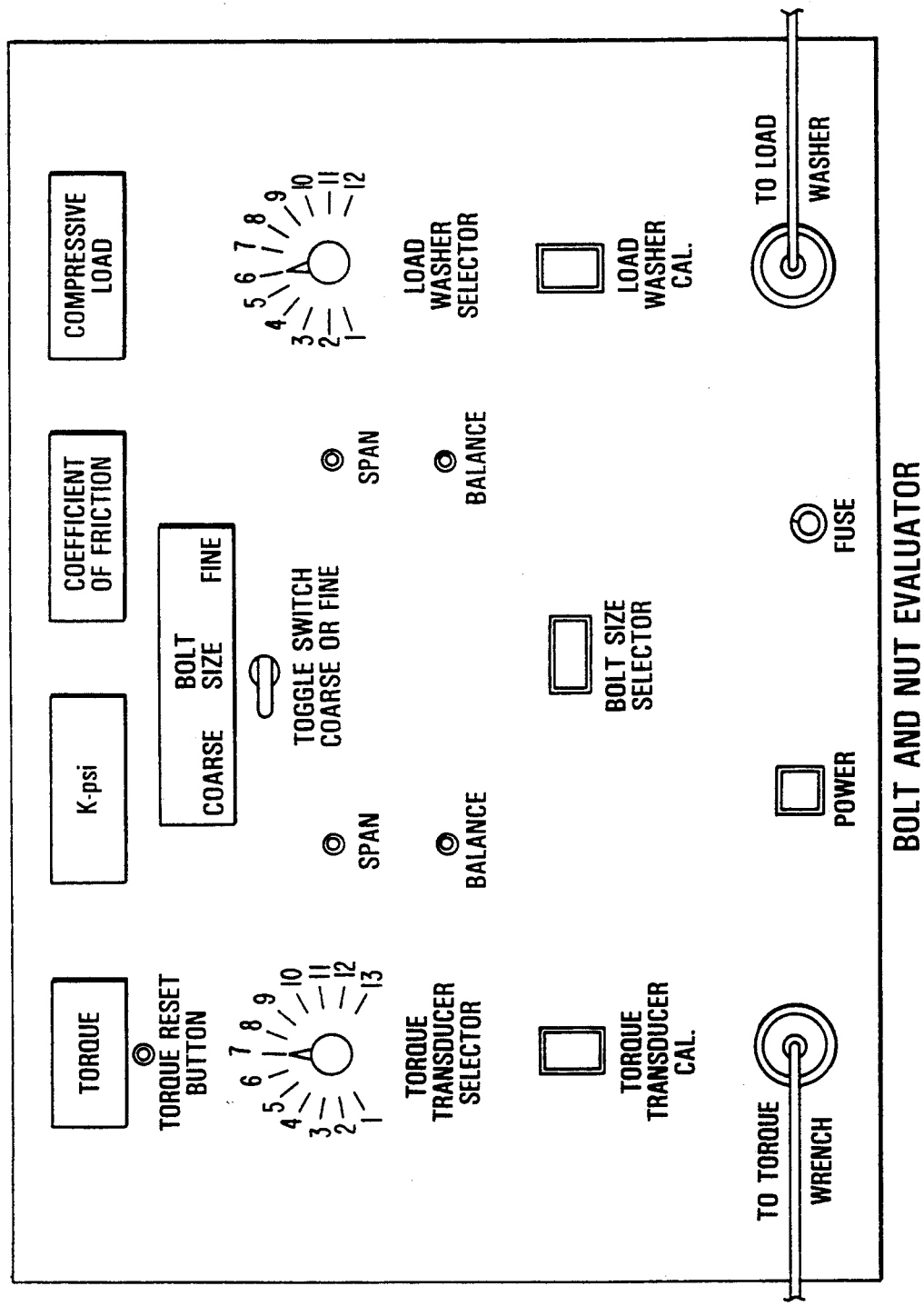
FIG. 14 is a pictorial view of the front panel of the electronics of FIGS. 13a–13j.

Refer again to FIG. 3. The loading is the same as before except there is a load washer 21 mounted between the bolt 13 head and base plate 1. Load washer 21 measures precisely what the pressure is, that is, that bolt 13 exerts on plate 1. The calculations below will show how this is related to torque. Torque =KDF. "K" is the coefficient of friction. "D" is the diameter of bolt 13 and "F" is the clamping force. Nomograph 24 (or a sliderule or the "bolt evaluator" of FIG. 14) can be clamped on plate 1. The wire leads from load washer 21 are shown as 22 and they terminate in electronic measuring device 23. If necessary, an automatic recording can be reproduced on tape while the torque can be similarly automatically applied. In this way many hundreds of bolts can be tested per hour.

Refer now to FIG. 5. This figure shows torque wrench 18 fitted over bolt 13 which is held to base plate 1 by nut 14. Washers 25 are placed on the top and the bottom of plate 1 so that bolt 13 and nut 14 can rotate on washers 25. A good lubricant is placed under the head of bolt 13 and on the threads of bolt 13. The coefficient of friction is accurate with a lubricated bolt and nut but not consistent when no lubricant is used. If a bolt is specified to be used with no lubricant, lubricant can be used to determine the strength of the bolt. Then the lubricant can be dissolved in Freon etc. A new coefficient of friction can then be obtained by using a load washer 21.

Refer now to FIG. 6. This figure shows the same features as FIG. 5 except that a tapped plate 26 is used in place of nut 14. Workmanship is important in tapped holes. The hole should be perpendicular to the top of plate 1. The tap should be clean and not cross-threaded. A load washer can be used to calibrate most of these cases. Once the coefficient of friction is established, it is no longer necessary to use the load washer. Thus when several hundred tapped holes are used there need be no more than one or two checks with a load washer. For "ball park" work it is not necessary to check at all if a good lubricant is used. In over 95% of the cases used over and over again, there is no need to use a load washer. It is only when a new metal such as titanium is used that it may be necessary to measure the coefficient of friction for several times. This can also be said of the bolts used in FIGS. 5, 7, 8 and 9.

Refer now to FIG. 7. Torque wrench 18, washer 25, base plate 1 and nut 14 are the same as FIG. 5. It should be noticed that a long washer 27 is needed to torque up nut 14 against base plate 1. Washer 27 should be made in one inch increments for extra long bolts. With normal long bolts, a series of washers 27 will serve the purpose. In most cases there is no need to makeup special long washers as many individual washers can serve the purpose well.

Refer now to FIG. 8. FIG. 8 is the same as FIG. 5 except load washer 28 is inserted between washer 25 of bolt 13 and Base Plate 1.

Refer now to FIG. 9. This is the same application as FIG. 6 except there is an insert 29 installed in lower plate 26. The same procedure is used here to find the coefficient of friction; to torque down bolt 13 to find yield where necessary.

Refer now to FIG. 10. A Bolt Nomograph 30 is shown. Keep in mind that a Bolt Sliderule or the bolt evaluator of FIG. 14 could also be used. Nomograph 30 (or a slide rule) calculates two things: T=KDF of which "T" is the torque in inch pounds, "K" is the torque coefficient of friction. "D" is the nominal diameter of the bolt. "F" is the clamping force exerted between bolt head 13 and Base Plate 1. The advantage of a nomograph (or a sliderule) over a computer or calculator is that it is easier to design with a nomograph. If a certain clamping force "F" is needed, a certain size bolt 13 can be assumed to take that load before yielding. A bolt evaluator can solve the equation T=KDF immediately. With the clamping force (F) known the stress can be calculated from the equation Stress=A/F. The area of the bolt is the effective stress area. It varies between rolled threads and cut threads. If the stress is much lower than the material allowable a smaller bolt can be used. If the stress calculated from the nomograph, bolt evaluator, or slide rule is higher than the allowable stress a larger bolt is needed. Then the nomograph operation, bolt evaluator, or slide rule operation can be repeated quickly. The right size can be learned very quickly.

OPERATION OF THE BOLT AND NUT EVALUATOR

The strength of the bolt can be verified by taking a nut which has been qualified and torquing the bolt up to yield. Note that all the increments of torquing 20% to 40%, 40% to 60%, 60% to 80% and 80% to 100% should all be the same. If they start to get longer, as illustrated on FIG. 3, then the yield point has been yielded. FIG. 3 shows that the bolt did not yield until after the 100% point. Thus the bolt is strong enough. Back the torque down and use it. If the increments get proportionally larger before reaching 100% then the bolt is not strong enough. The bolt is destroyed for use but it was no good anyway.

In the same manner a nut can be tested. In this case a good bolt must be used to test an unknown nut. The bolt could be stronger than the nut because the bolt is not the item that is being tested. Thus the bolt can be used over and over again. This bolt can be calibrated with a load washer.

To determine the coefficient of friction load washer 21, the embodiment illustrated in FIG. 3 can be used. As the torque is applied to wrench 18 a coefficient of friction can be assumed, say "0.15". With this coefficient the clamping force for a particular torque can be calculated on nomograph 24 (or a slide rule). The bolt is torqued up to this point. If the reading on meter 23 is the same, the coefficient of friction was correctly assumed. When certain types of bolts are used over and over again this coefficient of friction is almost automatic. However, it is good once in a while to check this assumption. The manufacturer may have changed his bolt making or thread rolling techniques.

In the field all that is needed is Mounting Plate 1 and paper 17 with torque wrench 18. The torque to yield can be calculated from the nomograph 24 or bolt evaluator. Then that torque is applied in equal increments as illustrated in FIG. 3. If the increments are equal then the bolt is good. Use it. It is not necessary to check every bolt in the box. Usually several bolts checked are adequate.

An insert is checked the same as a nut. A verified bolt is used which is torqued. If equal increments up to yield are read, the insert is all right. The measurement bolt is taken out and the operating bolt is used. This operation is seldom done because the threads in the insert are equal to the diameter of the bolt and sufficiently strong to hold the bolt.

Determining safe operating torques. If bolts are used over and over again at a high torques several bolts should be torqued up many times on plate 1 to see if they will begin to yield after a period of time. This can be done by going directly to yield 20 or 30 times. Then measure the increments of torque up to yield. If they are the same, then the bolt can be used over and over again. However, it may not be wise to use the bolts that are ever used in fatigue testing such as this.

The same operations described above can be used on very short bolts. FIG. 2 shows the plate 8 that is used to test such short bolts. The mounting paper 17 is smaller and mounted on the thin plate 8.

Standard bolts and nuts may be adequate as determined by metallurgical testing but the coefficient of friction for a certain operation may not be known. This coefficient of friction can be performed as described in FIG. 3.

The same methods described above can be used in a tapped hole as well as with a nut. This type of loading is usually not as critical, but it should be checked to be sure that there are enough threads to hold the bolt.

Different coefficients of friction can be found for different lubricants. This should be done when a new type of lubricant is introduced. The same methods as described above are used to find the coefficient with a load washer on FIG. 3.

When aluminum or titanium bolts are used the same procedure has to be used to obtain a correct coefficient of friction. The same procedure with the load washer of FIG. 3 are used. It should be noted that most aluminum bolts do not have a linear load deflection curve. It should be expected that the increments of rotation would vary more than that of steel. Several bolts should be used to get an idea what accuracy could be expected.

The present inventive technique was used with the Kaynar Microdot nuts to determine a method of torquing. It was discovered that the bolts were excellent in vibration and strength but the torques varied all over the map. By torquing up to yield three times (without increments) the bolts would be very predictable. It is necessary to use the load washer as illustrated on FIG. 3.

The present inventive method without the load washer can be used in the field anywhere anytime. It is most useful when a man in the field may think that he has a box of bolts that are not up to specs. He can verify it right on the spot.

There are automatic readouts for torque and clamping force and this method can be used along with these tools. Just take the bolts up in increments.

Locknuts have a higher torsional friction than ordinary nuts. Usually this torque is a constant. With the method illustrated on FIG. 3 with the load washer the torque for these kind of nuts can be determined.

Figure 11A:
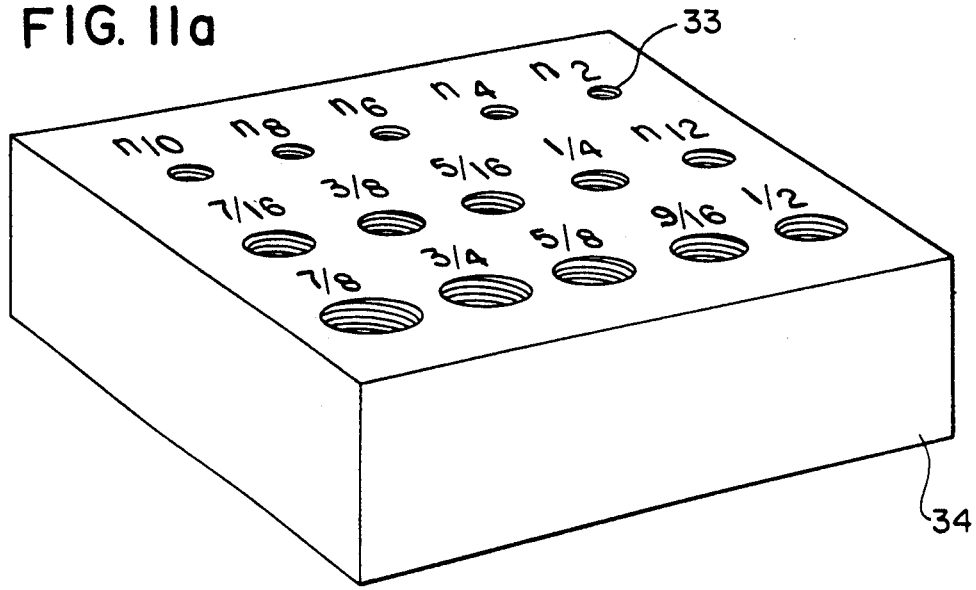
FIGS. 11a and 11b illustrate blocks used to measure ductility of bolts and nuts.
Figure 11B:
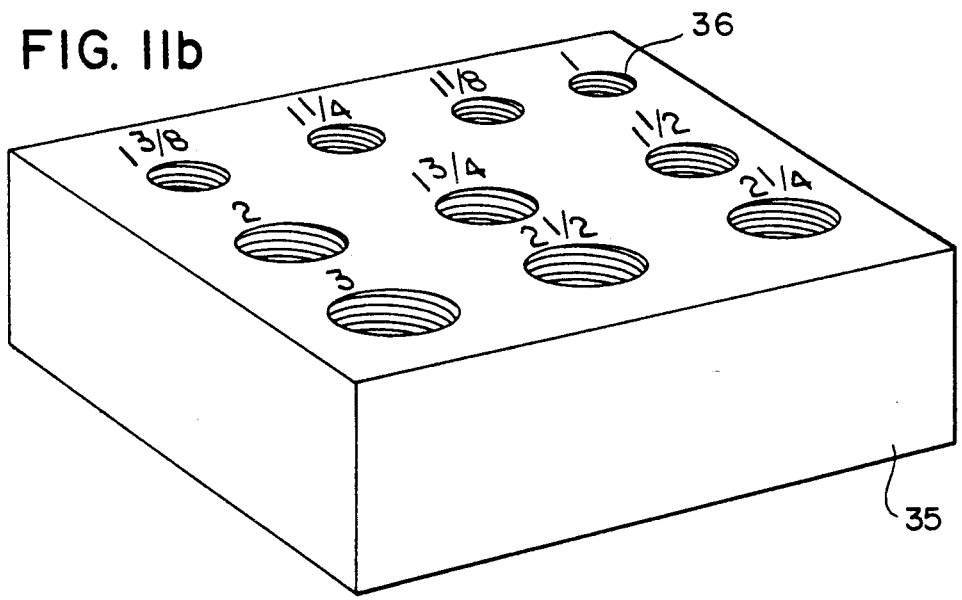
Figure 13A:
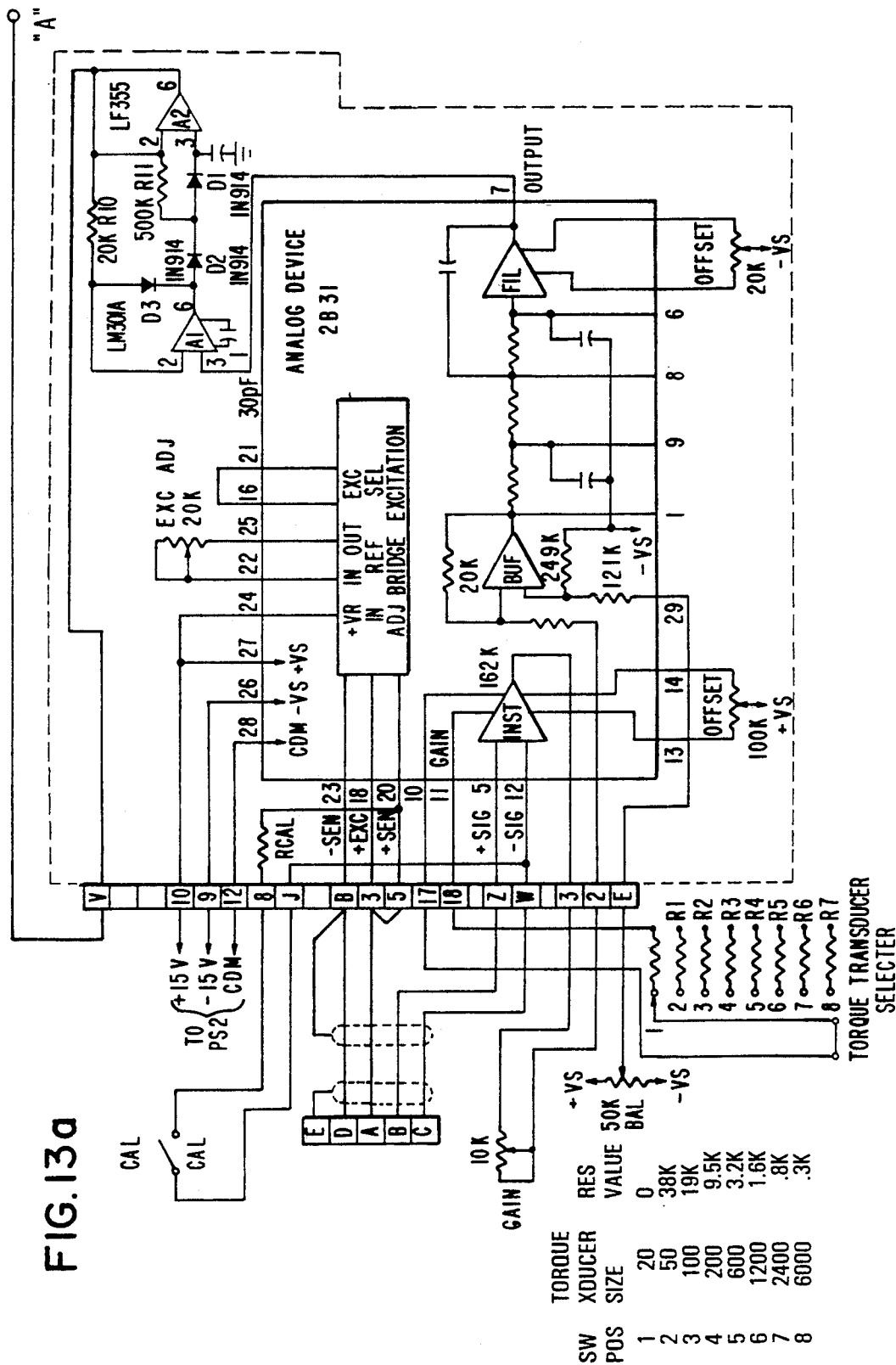
Figure 13C:
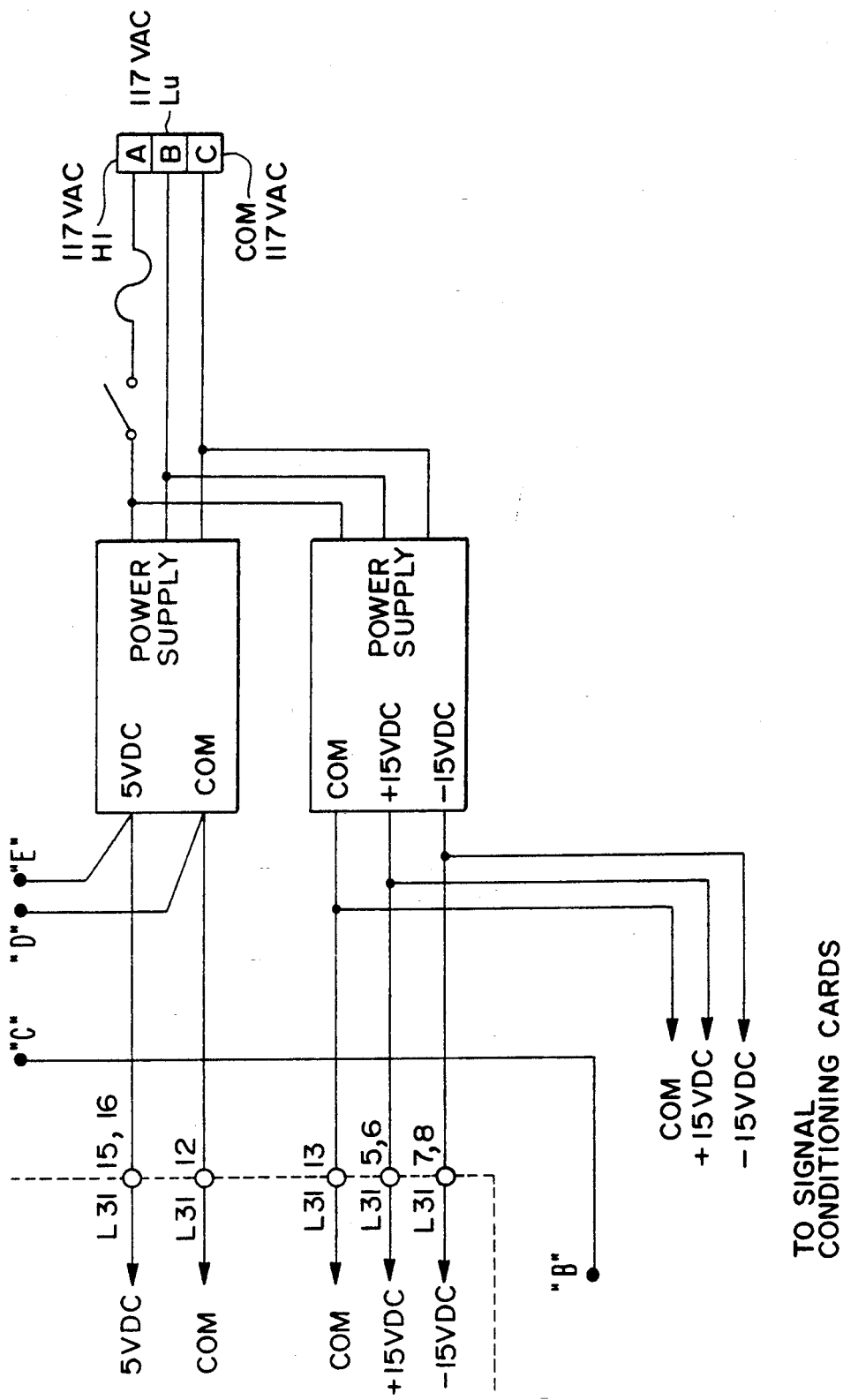
Figure 13D:
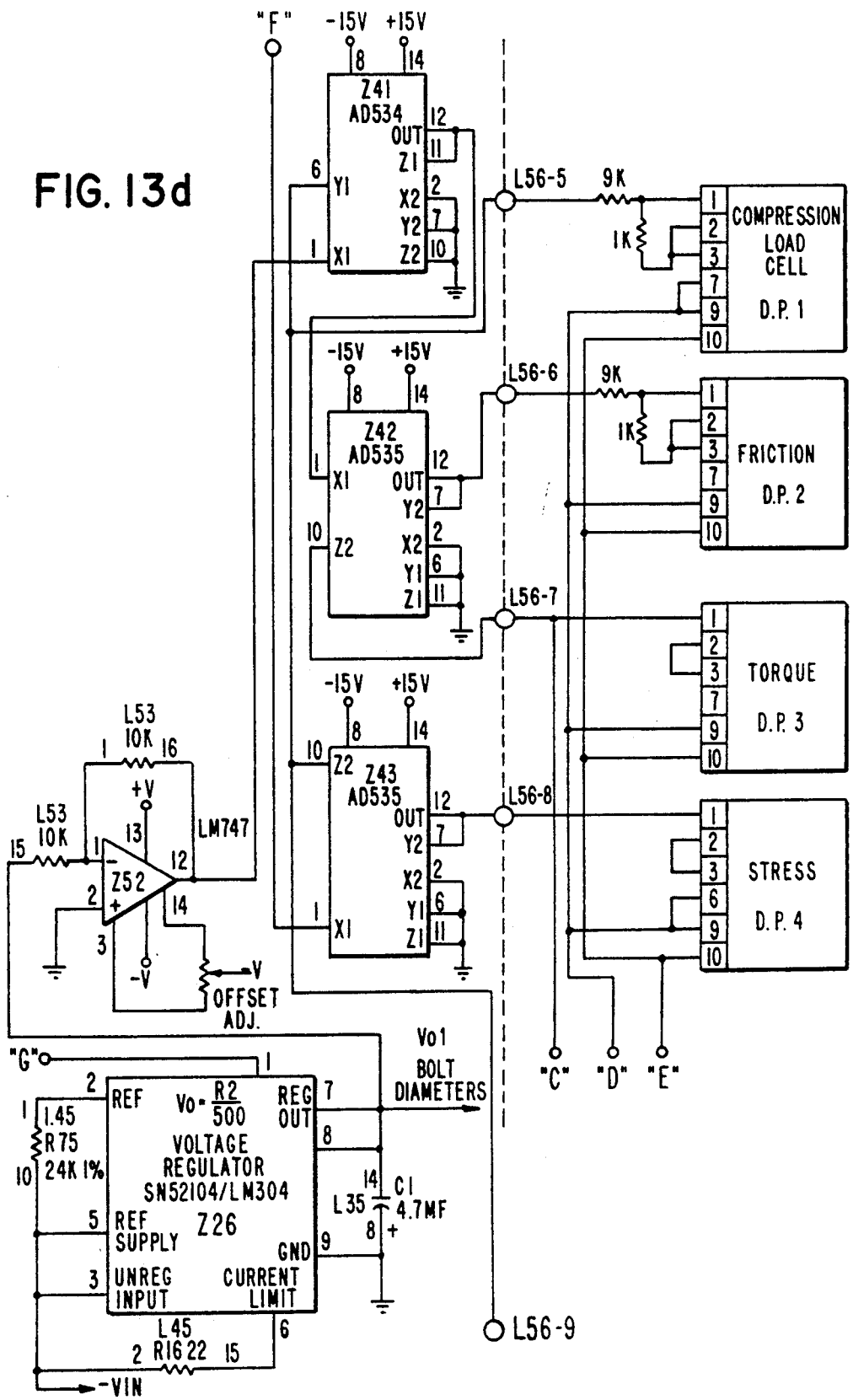
Figure 13E:
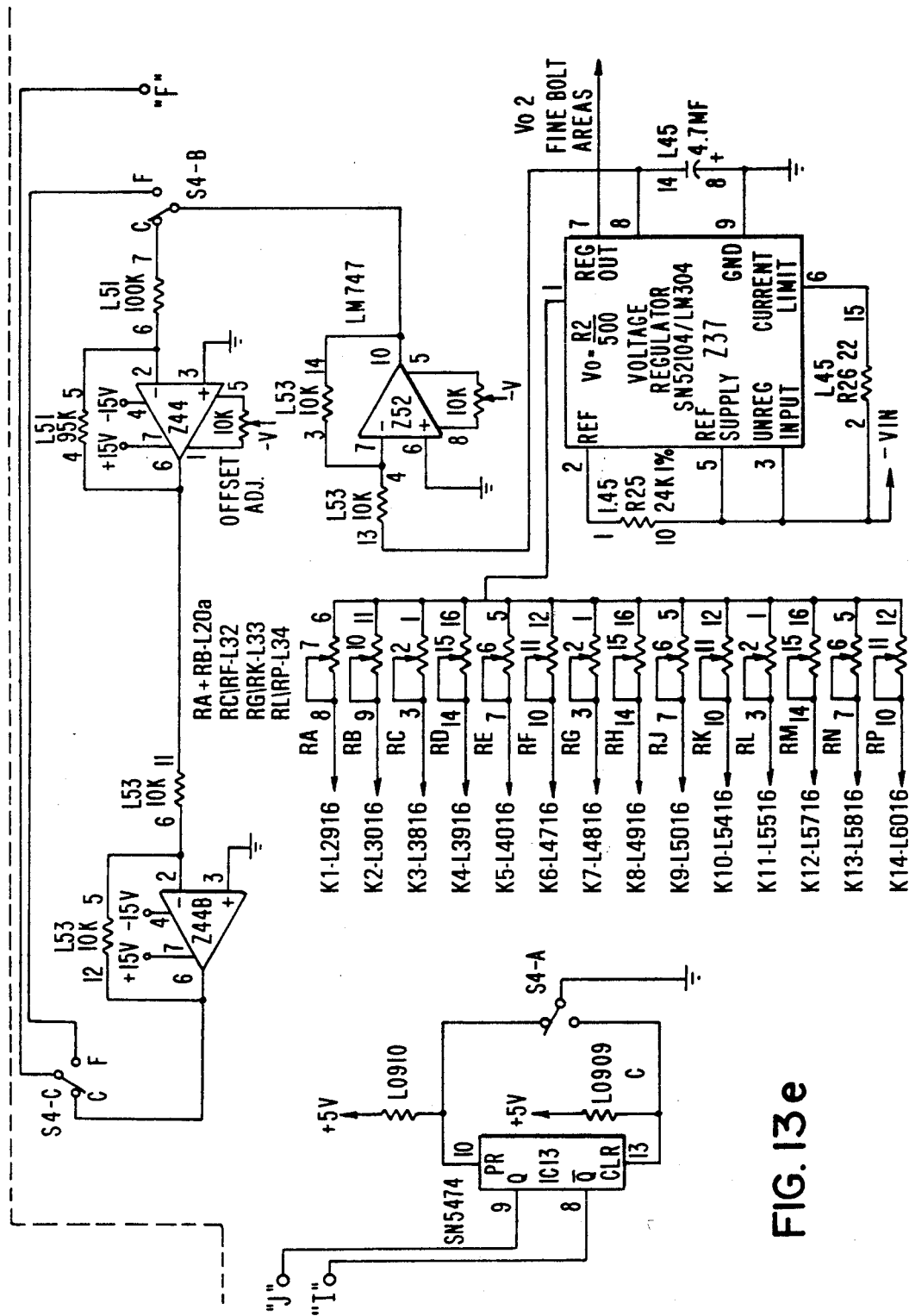
Figure 13F:
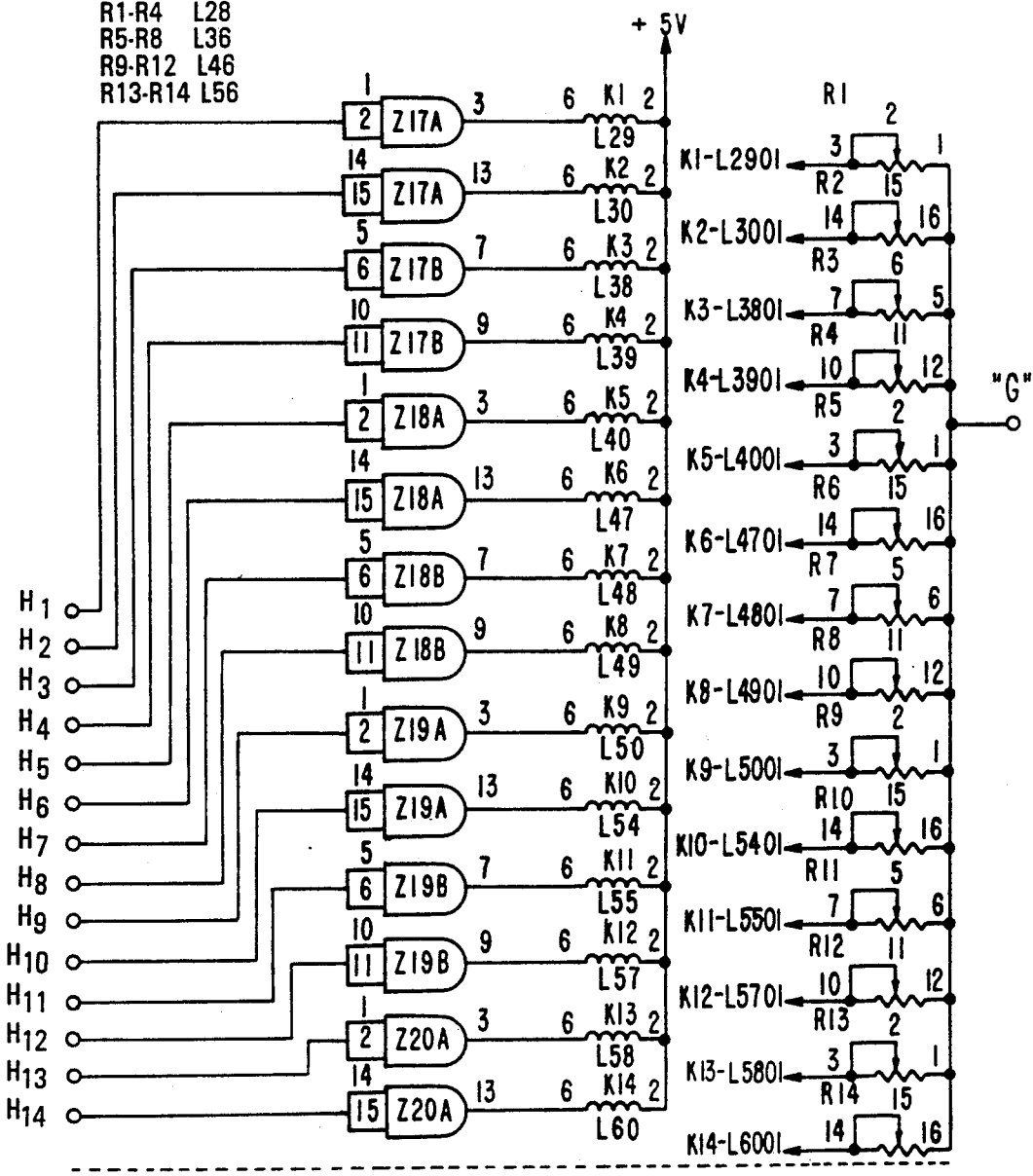
Figure 13G:
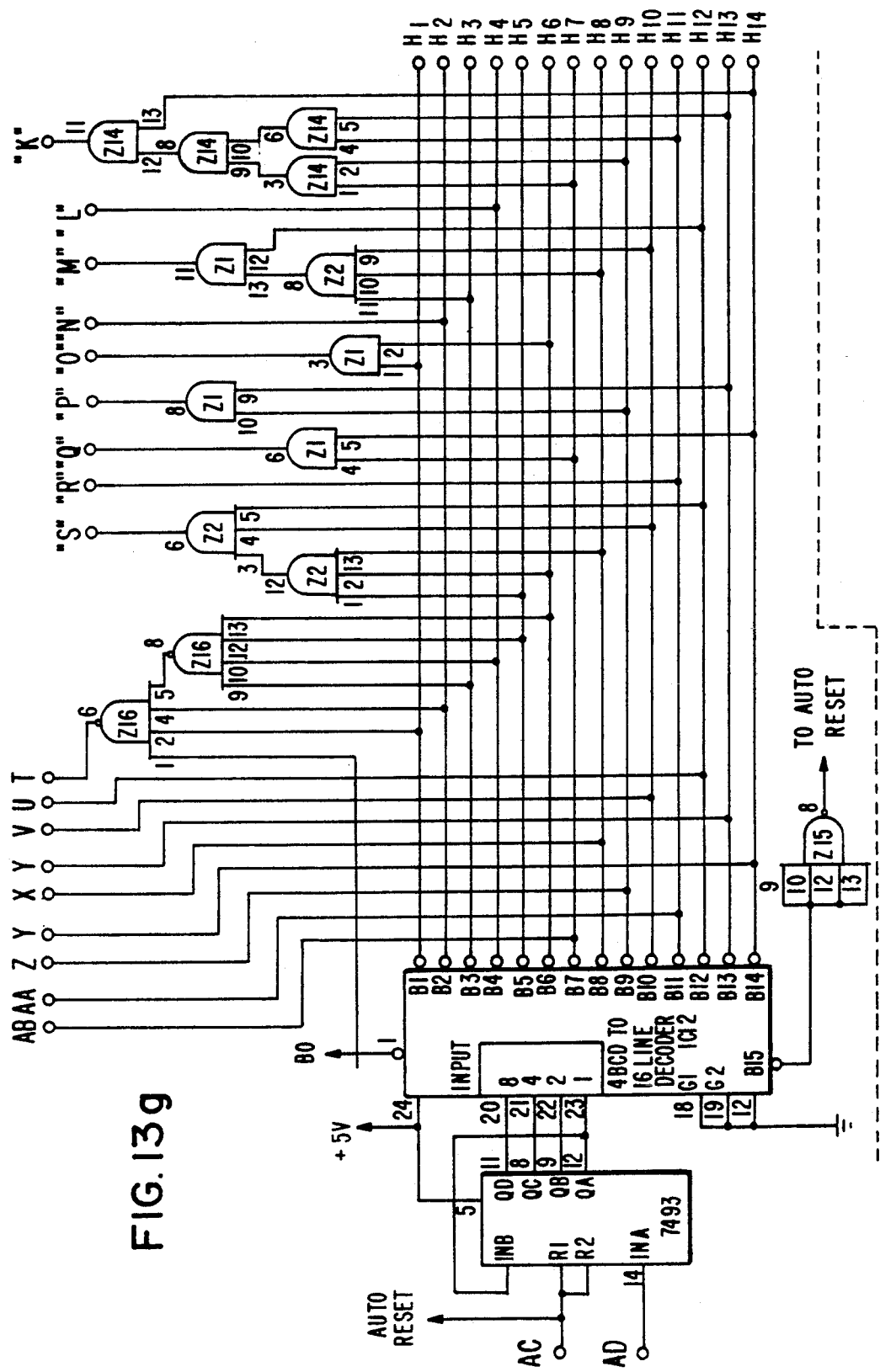
Figure 13I:
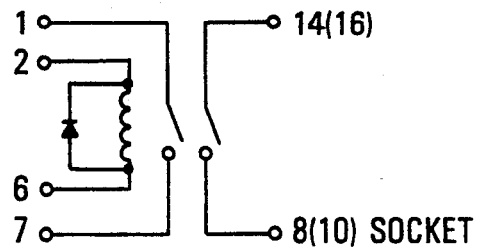
Figure 13J:
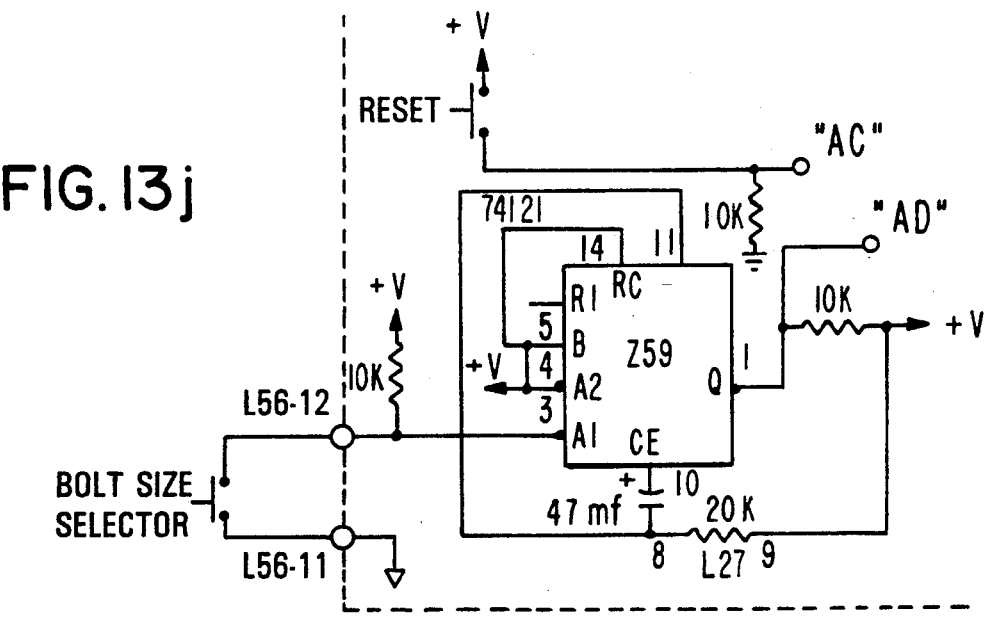

The present inventive technique can be used to measure ductility of bolts and nuts as illustrated in FIGS. 11a, 11b and 12. Two blocks 34 and 35 are made from 4130 or 4340 steel in the annealed or normalized state. Tapped holes 33 and 36 are provided. Then the steel is heat treated to at least 220,000 psi. Then the surfaces mounted next to base plate 1 are ground smooth to a finish of 25. The plate is mounted as shown in FIG. 12. If the bolt is long, washers are used on top of plate 1. The block is prevented from rotating by bolt 16. The bolt to be tested is then turned up until it breaks. If it is brittle it will break within two increments already measured between 80% load to yield and 100% to yield. If the bolt is ductile it will move at least 3 or 4 times the increments between 80% and 100%. When new types of bolts are used it is good to take a bolt with a known % elongation of 3% and torque to destruction. Then turn a bolt with 12% elongation and notice the difference for that type of bolt under similar loading conditions.

Finally, the electronics of electronic measuring device (or bolt evaluator) 23 are shown in FIGS. 13a thru 13j, which, when combined together, form a block diagram of electronic measuring device 23. The block diagram is self explanatory to those skilled in the art. Its use is as follows:

1) A bolt is selected and put under a load washer with no torque.
2) The torque reset button is used to take the past reading torque out of the electronics and make it ready for the present bolt.
3) The bolt size selector is tapped to mark the size of the bolt to be tested such as ¼ or ⅜. The toggle switch is moved left or right to get fine thread of coarse thread.
4) The torque transducer cal. is tapped to get 0 in the balance and a pre-determined torque in the span.
5) The load washer cal is tapped to get 0 in the balance and a predetermined load in the span.
6) The power switch is marked as well as the fuse.
7) The torque wrench is rotated to get a pre-determined torque on the bolt.
8) The torque wrench is rotated to get a pre-determined stress or load in the bolt. Throughout these operations the coefficient of friction is read.

The bolt evaluator then calculates the load and stress in the bolt so that the clamping force is seen immediately and the stress issee to be below the allowable stress in that bolt.

To those skilled in the art, many modifications and variations of the present invention are possible in light of the above teachings. It is therefore to be understood that the present invention can be practiced otherwise than as specifically described herein and still will be within the spirit and scope of the appended claims.

I claim:

1. A device for testing fasteners comprising:
   a fixed base plate having a plurality of holes of varying size for receiving said fasteners to be tested;
   torque marking paper affixed to said fixed base plate for receiving torque-angle indicia;
   a torque applying means for applying torque to said fasteners being tested; and
   means for indicating said applied torque.

2. The device of claim 1 wherein said plurality of holes of varying size includes threaded holes and unthreaded holes.

3. The device of claim 2 wherein said torque applying means comprises a torque wrench, said torque wrench also having said means for indicating said applied torque.

4. The device of claim 3 further including a means enabling testing of short bolts.

5. The device of claim 3 further including electronic means for measurement of clamping force and coefficient of friction.

* * * * *